United States Patent
Covell et al.

(10) Patent No.: US 11,838,340 B2
(45) Date of Patent: Dec. 5, 2023

(54) DYNAMIC MUTE CONTROL FOR WEB CONFERENCING

(71) Applicant: International Business Machines Corporation, Armonk, NY (US)

(72) Inventors: Jacob Thomas Covell, New York, NY (US); Zachary A. Silverstein, Georgetown, TX (US); Nicholas Bokun, Stratford, NJ (US); Tyler Ems, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 17/448,064

(22) Filed: Sep. 20, 2021

(65) Prior Publication Data

US 2023/0090613 A1 Mar. 23, 2023

(51) Int. Cl.
*H04L 65/4038* (2022.01)
*G06F 3/16* (2006.01)

(52) U.S. Cl.
CPC .......... *H04L 65/4038* (2013.01); *G06F 3/165* (2013.01)

(58) Field of Classification Search
CPC ....................................................... G06F 3/165
See application file for complete search history.

(56) References Cited

U.S. PATENT DOCUMENTS

| | | | |
|---|---|---|---|
| 9,767,828 B1 | 9/2017 | Velusamy | |
| 10,776,073 B2 | 9/2020 | Lenke | |
| 11,405,584 B1 * | 8/2022 | Grover | H04N 7/147 |
| 2007/0025335 A1 | 2/2007 | Patel | |
| 2014/0171047 A1 | 6/2014 | Mai | |
| 2015/0215351 A1 * | 7/2015 | Barzuza | H04N 7/157 715/757 |
| 2017/0093944 A1 * | 3/2017 | Hockett | H04L 12/1818 |
| 2021/0359872 A1 * | 11/2021 | Deole | H04R 29/004 |

FOREIGN PATENT DOCUMENTS

| | | |
|---|---|---|
| CN | 105529028 A | 4/2016 |
| CN | 110322869 A | 10/2019 |
| CN | 111445916 A | 7/2020 |
| CN | 112203038 A | 1/2021 |

OTHER PUBLICATIONS

"Patent Cooperation Treaty PCT International Search Report", Applicant's File Reference: F22W2412, International Application No. PCT/CN2022/106932, International Filing Date: Jul. 21, 2022, dated Sep. 30, 2022, 9 pages.

* cited by examiner

*Primary Examiner* — Brian Whipple
(74) *Attorney, Agent, or Firm* — Michael O'Keefe

(57) ABSTRACT

In an approach to dynamic mute control for web conferencing, one or more computer processors detect a start of a collaborative meeting. One or more computer processors receive a request to enable a dynamic mute feature for a microphone associated with a device of a user. One or more computer processors mute the microphone. One or more computer processors monitor the collaborative meeting to derive context. One or more computer processors determine a request for the user to participate in the collaborative meeting. One or more computer processors calculate an unmute confidence score based on the derived context.

20 Claims, 3 Drawing Sheets

DYNAMIC MUTE CONTROL FOR WEB CONFERENCING

BACKGROUND OF THE INVENTION

The present invention relates generally to the field of machine learning, and more particularly to dynamic mute control for web conferencing.

Currently, many industries are trending toward cognitive models enabled by big data platforms and machine learning models. Cognitive models, also referred to as cognitive entities, are designed to remember the past, interact with humans, continuously learn, and continuously refine responses for the future with increasing levels of prediction. Machine learning explores the study and construction of algorithms that can learn from and make predictions on data. Such algorithms operate by building a model from example inputs in order to make data-driven predictions or decisions expressed as outputs, rather than following strictly static program instructions. Within the field of data analytics, machine learning is a method used to devise complex models and algorithms that lend themselves to prediction. These analytical models allow researchers, data scientists, engineers, and analysts to produce reliable, repeatable decisions and results and to uncover hidden insights through learning from historical relationships and trends in the data.

Natural language processing (NLP) is a field of computer science, artificial intelligence, and linguistics concerned with the interactions between computers and human (natural) languages. As such, natural language processing is related to the area of human— computer interaction. Many challenges in natural language processing involve natural language understanding, that is, enabling computers to derive meaning from human or natural language input.

Web conferencing is used as an umbrella term for various types of online conferencing and collaborative services including webinars ("web seminars"), webcasts, and web meetings. Web conferencing offers data streams of text-based messages, voice, and video chat to be shared simultaneously across geographically dispersed locations. Applications for web conferencing include meetings, training events, lectures, or presentations from a web-connected computer to other web-connected computers. Depending on the technology being used, participants may speak and listen to audio over standard telephone lines or via computer microphones and speakers. Some products allow for use of a webcam to display participants, as well as screen sharing capability for display of content from a participant's computer.

SUMMARY

Embodiments of the present invention disclose a computer-implemented method, a computer program product, and a system for dynamic mute control for web conferencing. The computer-implemented method may include one or more computer processors detecting a start of a collaborative meeting. One or more computer processors receive a request to enable a dynamic mute feature for a microphone associated with a device of a user. One or more computer processors mute the microphone. One or more computer processors monitor the collaborative meeting to derive context. One or more computer processors determine a request for the user to participate in the collaborative meeting. One or more computer processors calculate an unmute confidence score based on the derived context.

DETAILED DESCRIPTION

Collaborative meetings, such as conference calls, web conferencing, or online meetings, can be difficult for a user to engage with at the same level as an in-person meeting due to various sources of distraction and interruption, for example, background noise, the presence of others in the same room or area, technology issues, and poor reception. Meeting participants may be tempted to mute the microphone associated with the device they are using for the meeting in order to, for example, answer a phone call or run an errand while listening to a web conference. Often, a meeting participant is unaware or has forgotten that they are on mute and can participate in a call for several minutes before realizing that the other meeting participants cannot hear what they are saying. Embodiments of the present invention recognize that efficiency may be gained by enabling a user to participate in a web conference on a context-based dynamic mute setting that can identify scenarios when a user should be unmuted automatically, thereby giving the user confidence that they will be heard when they are participating in a meeting and muted at other times. Embodiments of the present invention also recognize that improvements to collaborative meetings may be made by streamlining the process of unmuting participants in a web conference while ensuring user privacy is maintained. Implementation of embodiments of the invention may take a variety of forms, and exemplary implementation details are discussed subsequently with reference to the Figures.

Figure 1:
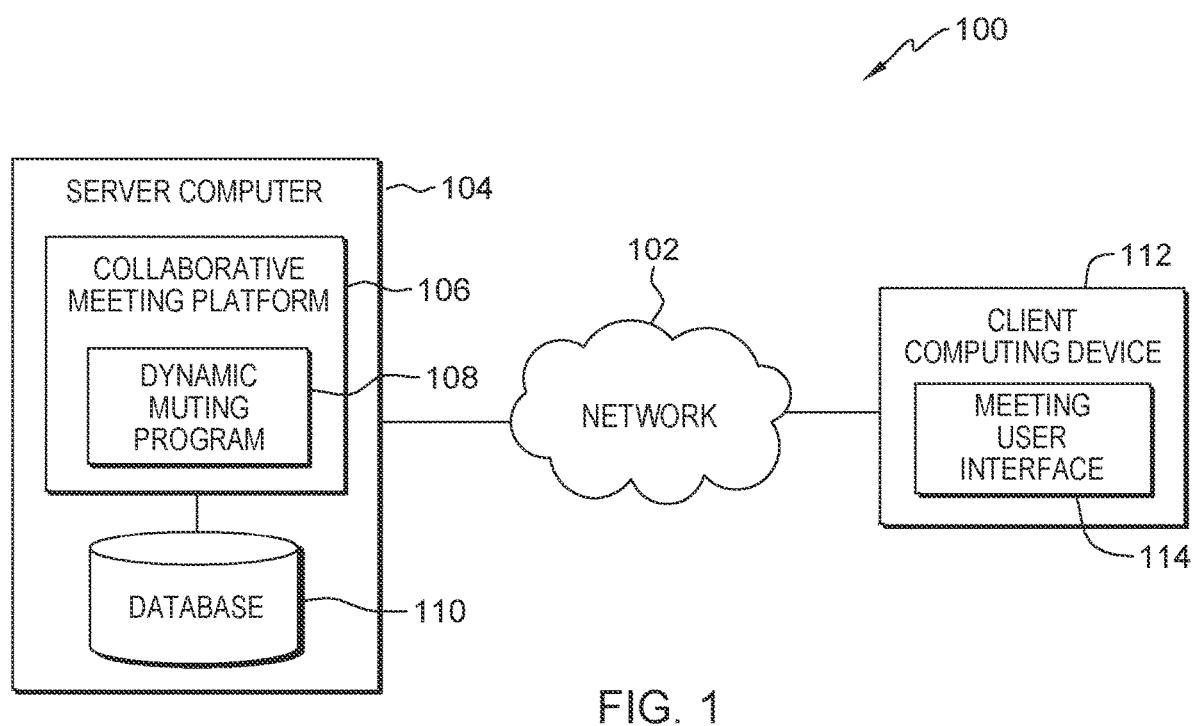
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and client computing device 112, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, client computing device 112, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with client computing device 112 and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes collaborative meeting platform 106 and database 110. Server computer 104 may include internal and external hardware components, as depicted and described in further detail with respect to FIG. 3.

Collaborative meeting platform 106 is one of a plurality of available software packages or online services with which users can hold live online meetings, conferencing, presentations, and training via the Internet, particularly on TCP/IP connections. Collaborative meeting platform 106 may also be known as online meeting software or, sometimes, simply video conferencing. Collaborative meeting platform 106 enables remote meetings based on Voice over Internet Protocol (VoIP), online video, instant messaging, file sharing, and screen sharing. In an embodiment, collaborative meeting platform 106 may be teleconferencing software with no video component. Collaborative meeting platform 106 includes dynamic muting program 108.

Dynamic muting program 108 is a learning-based system that passively analyzes collaborative meetings to identify scenarios when a user should be unmuted based on factors such as audio cues, visual cues, background noise, conversation context, etc., and dynamically selects an automated response based on these factors and the context of the user's environment. In the depicted embodiment, dynamic muting program 108 is a component of collaborative meeting platform 106. In another embodiment, dynamic muting program 108 is a standalone program that interacts with collaborative meeting platform 106 and client computing device 112 and may reside elsewhere within distributed data processing environment 100 provided that collaborative meeting platform 106 has access to dynamic muting program 108, via network 102. For example, dynamic muting program 108 may be a feature within a video conferencing platform associated with a vehicle to be used for hands-free video conferencing while driving.

Dynamic muting program 108 detects the start of a collaborative meeting. Dynamic muting program 108 receives a dynamic mute request from the user. Dynamic muting program 108 monitors the meeting to derive meeting context. Dynamic muting program 108 determines a request for the user to participate in the meeting. Dynamic muting program 108 calculates an unmute confidence score and compares the score to a high confidence threshold and a low confidence threshold. If dynamic muting program 108 determines the confidence score is above the high confidence threshold, then dynamic muting program 108 unmutes the user. If dynamic muting program 108 determines the confidence score is below the low confidence threshold, then dynamic muting program 108 continues to mute the user. If dynamic muting program 108 determines the confidence score is between the high confidence threshold and the low confidence threshold, then dynamic muting program 108 prompts the user for a signal to unmute. If dynamic muting program 108 receives a signal, then dynamic muting program 108 unmutes the user, otherwise dynamic muting program 108 continues to mute the user. Dynamic muting program 108 stores user input and context details. Dynamic muting program 108 is depicted and described in further detail with respect to FIG. 2.

Database 110 stores information used by and generated by collaborative meeting platform 106 and dynamic muting program 108. In the depicted embodiment, database 110 resides on server computer 104. In another embodiment, database 110 may reside elsewhere within distributed data processing environment 100, provided that collaborative meeting platform 106 and dynamic muting program 108 have access to database 110, via network 102. A database is an organized collection of data. Database 110 can be implemented with any type of storage device capable of storing data and configuration files that can be accessed and utilized by collaborative meeting platform 106 and dynamic muting program 108, such as a database server, a hard disk drive, or a flash memory.

Database 110 stores user profiles submitted by the user of client computing device 112 and other users of collaborative meeting platform 106 and dynamic muting program 108, via meeting user interface 114. The user profiles may include, but are not limited to, the name of the user, one or more alternate names of the user, an address, an email address, a voice sample, a phone number, a credit card number, an account number, an employer, a job role, a job family, a business unit association, a job seniority, a job level, a resume, a medical record, a social network affiliation, etc. The user profile may also include user preferences. For example, a user may define an unmuting confirmation signal that, when given to dynamic muting program 108, indicates the user wants to be unmuted. In another example, a user may define a preference such as to not unmute when driving unless the user gives the unmute confirmation signal. In addition, database 110 stores data associated with a caller behavioral profile, where dynamic muting program 108 collects and stores the data. The caller behavioral profile may include, for example, common phrases the user speaks just prior to answering a question, such as "to answer your question" or "yeah, so." The caller behavioral profile may also include, for example, one or more facial expressions a user makes just prior to answering a question, for example, smiling or blinking. Database 110 also stores one or more pre-defined unmute confidence thresholds which dynamic muting program 108 uses for comparison. In an embodiment, database 110 stores a high confidence threshold and a low confidence threshold.

In an embodiment, database 110 stores a neural network model (not shown) used by dynamic muting program 108 to analyze a user/meeting scenario and calculate the unmute confidence score. The trained neural network model includes one or more hidden layers. In neural networks, a hidden layer is located between the input and output of the algorithm, in which the function applies weights to the inputs and directs them through an activation function as the output. In short, the hidden layers perform nonlinear transformations of the inputs entered into the network. The usage of hidden layers in this neural network can achieve and significantly increase accuracy. In an embodiment, the neural network model is also trained using one or more hyperparameters, i.e., influencing variables, that act as additional hidden layer related entities. In an embodiment, the neural network model is a function included in dynamic muting program 108. In an embodiment, the neural network model is used for continuous learning of mute/unmute scenarios.

The present invention may contain various accessible data sources, such as database 110, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Dynamic muting program 108 enables the authorized and secure processing of personal data. Dynamic muting program 108 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Dynamic muting program 108 provides information regarding personal data and the nature (e.g., type, scope, purpose, duration, etc.) of the processing. Dynamic muting program 108 provides the user with copies of stored personal data. Dynamic muting program 108 allows the correction or completion of incorrect or incomplete personal data. Dynamic muting program 108 allows the immediate deletion of personal data.

Client computing device 112 can be one or more of a laptop computer, a tablet computer, a smart phone, smart watch, a smart speaker, or any programmable electronic device capable of communicating with various components and devices within distributed data processing environment 100, via network 102. Client computing device 112 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch. In an embodiment, client computing device 112 may be integrated into a vehicle of the user. For example, client computing device 112 may include a heads-up display in the windshield of the vehicle. In general, client computing device 112 represents one or more programmable electronic devices or combination of programmable electronic devices capable of executing machine readable program instructions and communicating with other computing devices (not shown) within distributed data processing environment 100 via a network, such as network 102. Client computing device 112 includes an instance of meeting user interface 114.

Meeting user interface 114 provides an interface between collaborative meeting platform 106 on server computer 104 and a user of client computing device 112. In one embodiment, meeting user interface 114 is mobile application software. Mobile application software, or an "app," is a computer program designed to run on smart phones, tablet computers and other mobile devices. In one embodiment, meeting user interface 114 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. Meeting user interface 114 enables a user of client computing device 112 to participate in meetings held using collaborative meeting platform 106. Meeting user interface 114 enables a user of client computing device 112 to complete a user profile and store the profile in database 110. Dynamic muting program 108 interacts with and uses meeting user interface 114 to assist participants, such as the user of client computing device 112, in a collaborative meeting.

Figure 2:
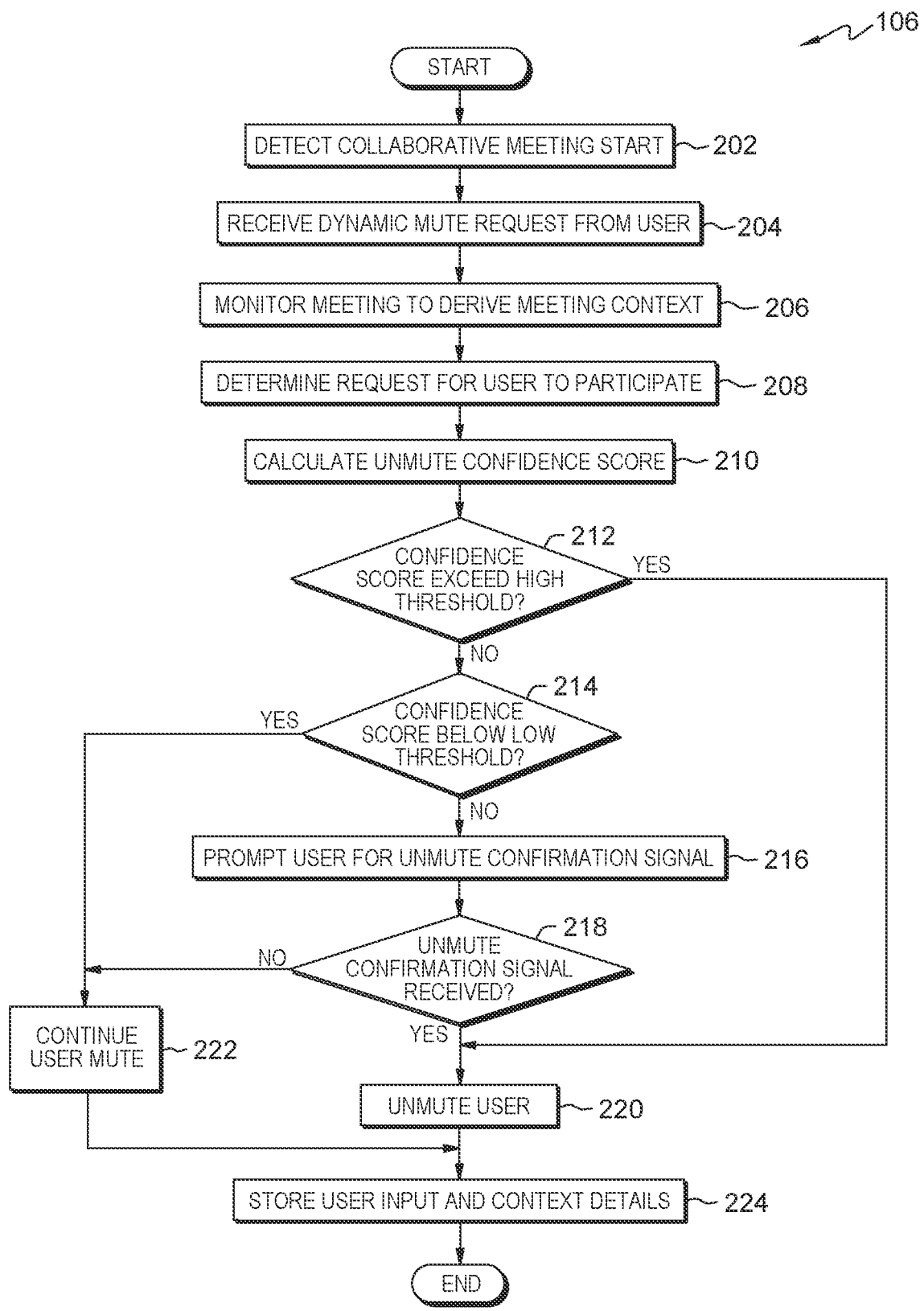
FIG. 2 is a flowchart depicting operational steps of a dynamic muting program, on a server computer within the distributed data processing environment of FIG. 1, for dynamic mute control for web conferencing, in accordance with an embodiment of the present invention.

FIG. 2 is a flowchart depicting operational steps of dynamic muting program 108, on server computer 104 within distributed data processing environment 100 of FIG. 1, for dynamic mute control for web conferencing, in accordance with an embodiment of the present invention.

Dynamic muting program 108 detects a collaborative meeting start (step 202). In an embodiment, when a user of client computing device 112 initiates or joins a web conference meeting on collaborative meeting platform 106, via meeting user interface 114, dynamic muting program 108 detects the meeting initiation. In one embodiment, dynamic muting program 108 may detect the user clicking on a link in meeting user interface 114 to initiate or join the collaborative meeting. In another embodiment, dynamic muting program 108 may detect the user of client computing device 112 or another participant sending a meeting notice, through collaborative meeting platform 106, an email application (not shown), or a calendaring application (not shown). In another embodiment, dynamic muting program 108 may detect a collaborative meeting start when the user of client computing device 112 or another participant uploads a meeting agenda to collaborative meeting platform 106.

Dynamic muting program 108 receives a dynamic mute request from the user (step 204). In an embodiment, when the user of client computing device 112 selects a dynamic mute feature from within collaborative meeting platform 106, dynamic muting program 108 receives a request to enable the dynamic mute feature for a microphone associated with client computing device 112. For example, dynamic muting program 108 may display two buttons, via meeting user interface 114, for a user to select from, labelled, for example, "locked mute" i.e., the standard mute feature, and "dynamic mute," and dynamic muting program 108 receives the request from the user upon the user selecting the "dynamic mute" button. In another example, in response to detecting the meeting start, dynamic muting program 108 may prompt the user in natural language, e.g., "Would you like to initiate the dynamic mute feature?" and dynamic muting program 108 receives the request when the user indicates a positive response to the prompt. In an embodiment, upon receiving the dynamic mute request, dynamic muting program 108 initiates dynamic muting and mutes the microphone associated with client computing device 112.

Dynamic muting program 108 monitors the meeting to derive meeting context (step 206). In an embodiment, dynamic muting program 108 continuously monitors the activity of the collaborative meeting to determine factors that influence the context of the meeting. For example, dynamic muting program 108 passively analyzes the ongoing conversation and/or scenario of the meeting. Other factors that dynamic muting program 108 monitors may include, but are not limited to, audio characteristics, volume of audio, video characteristics, characteristics of the user of client computing device 112 as well as one or more other participants in the meeting, such as posture, gaze, motion, stance, sitting/standing status, speaking cadence, speaking direction, existence of other people in a room with the user, time of day, historical data related to the user's participation in the current meeting or previous meetings, computer interactions, etc. In an embodiment, dynamic muting program 108 also derives context from the external environment and/or the location of the user. For example, dynamic muting program 108 may determine the user is driving based on the movement of client computing device 112. In another example, dynamic muting program 108 may determine that the user is at home, in the kitchen, preparing a meal. In yet another example, dynamic muting program 108 may determine the user is walking a dog.

Dynamic muting program 108 determines a request is made for the user to participate in the meeting (step 208). In an embodiment, while monitoring the collaborative meeting, dynamic muting program 108 detects another participant asking for input from the user of client computing device 112. In the embodiment, dynamic muting program 108 uses one or more known translation/transcription methods and/or natural language processing (NLP) classification techniques to analyze the prior 30 seconds of the meeting to determine that a question was directed to the user. For example, dynamic muting program 108 may parse a request such as "Hey, User X, what did you think of the presentation?" where User X is the user of client computing device 112, to determine there is a request for the user to participate in the meeting.

Dynamic muting program 108 calculates an unmute confidence score (step 210). In an embodiment, dynamic muting program 108 computes a score associated with a confidence that the user would like to be unmuted in the current scenario. In an embodiment, dynamic muting program 108 utilizes an artificial neural network to analyze the scenario and/or context of the meeting by calculating the confidence score. Dynamic muting program 108 calculates the confidence score based on one or more different factors. In an embodiment, dynamic muting program 108 bases the confidence score on visual data. For example, dynamic muting program 108 determines whether the user has stepped back into the frame of a camera associated with client computing device 112, such that the user is now visible in the meeting. In another example, dynamic muting program 108 determines whether the mouth and/or the hands of the user are moving, indicating the user is speaking. In yet another example, dynamic muting program 108 may use eye-tracking technology associated with client computing device 112 to determine if the user is facing the camera associated with client computing device 112. In a further example, dynamic muting program 108 may analyze a facial expression of the user. In an embodiment, dynamic muting program 108 bases the confidence score on audio data. For example, dynamic muting program 108 may determine that the user is actively talking. In another example, dynamic muting program 108 may determine whether the content of what the user is saying matches the context of the current conversation in the meeting. In yet another example, dynamic muting program 108 determines whether the user started speaking by uttering a common phrase, i.e., a phrase consistent with the caller behavioral profile in database 110. In an embodiment, dynamic muting program 108 uses both visual and audio data to calculate the unmute confidence score.

Dynamic muting program 108 determines whether the confidence score exceeds a high confidence threshold (decision block 212). In an embodiment, dynamic muting program 108 compares the calculated unmute confidence score to a pre-defined high confidence threshold used for determining whether to automatically unmute the user. In an embodiment, the user of client computing device 112 pre-defines the high confidence threshold and stores the high confidence threshold in database 110. In another embodiment, a system administrator of collaborative meeting platform 106 pre-defines the high confidence threshold and stores the high confidence threshold in database 110. In yet another embodiment, dynamic muting program 108 crowd-sources the high confidence threshold and stores the high confidence threshold in database 110. In an embodiment, dynamic muting program 108 adjusts a confidence threshold based on the derived context. For example, if dynamic muting program 108 determines the user is driving, then dynamic muting program 108 may adjust the high confidence threshold lower to improve the likelihood that the calculated unmute confidence score exceeds the high confidence threshold.

If dynamic muting program 108 determines the confidence score does not exceed the high confidence threshold ("no" branch, decision block 212), then dynamic muting program 108 determines if the confidence score is below a low confidence threshold (decision block 214). In an embodiment, dynamic muting program 108 compares the calculated unmute confidence score to a pre-defined low confidence threshold used for determining whether to prompt the user regarding mute status. In an embodiment, the user of client computing device 112 pre-defines the low confidence threshold and stores the low confidence threshold in database 110. In another embodiment, a system administrator of collaborative meeting platform 106 pre-defines the low confidence threshold and stores the low confidence threshold in database 110. In yet another embodiment, dynamic muting program 108 crowd-sources the low confidence threshold and stores the low confidence threshold in database 110.

If dynamic muting program 108 determines the confidence score is not below the low confidence threshold ("no" branch, decision block 214), then dynamic muting program 108 prompts the user for an unmute confirmation signal (step 216). In an embodiment where the unmute confidence score is between the high confidence threshold and the low confidence threshold, dynamic muting program 108 prompts the user for an indication of whether unmuting is the intended action. For example, dynamic muting program 108 may display a message, via user interface 114, that says "Please display unmute confirmation signal," or, more simply, "Unmute?"

Dynamic muting program 108 determines whether an unmute confirmation signal is received (decision block 218). In an embodiment, the user pre-defines one or more unmute confirmation signals and stores the one or more unmute confirmation signals in database 110. By pre-defining the unmute confirmation signals, the user configures and teaches dynamic muting program 108 to recognize the signals. In an embodiment, the unmute confirmation signal is a hands-free signal, especially useful in scenarios where the user is driving, or cooking, or otherwise using their hands. For example, the user may pre-define a head nod or an eye wink to indicate that unmuting is the intended action. In another embodiment, the unmute confirmation signal may use one hand. For example, the user may pre-define a wave or a raised index finger as an unmute confirmation signal. In another embodiment, dynamic muting program 108 learns the unmute confirmation signal over time, leveraging supervised learning techniques, as would be recognized by a person of skill in the art. Responsive to prompting the user for an unmute confirmation signal, dynamic muting program 108 determines whether the user is providing a pre-defined unmute confirmation signal.

If dynamic muting program 108 determines an unmute confirmation signal is received ("yes" branch, decision block 218), or if dynamic muting program 108 determines the confidence score is above the high confidence threshold ("yes" branch, decision block 212), then dynamic muting program 108 unmutes the user (step 220). In an embodiment, in response to determining that unmuting is the intended action of the user, dynamic muting program 108 automatically unmutes the microphone associated with client computing device 112 such that the user can be heard in the collaborative meeting. In an embodiment, after unmuting the user, if dynamic muting program 108 determines that the user is no longer speaking or actively participating in the meeting, then dynamic muting program 108 puts the user back on mute until dynamic muting program 108 determines there is a new request for the user to participate.

In an embodiment, prior to unmuting the microphone, dynamic muting program 108 analyzes the context of the background environment of the user in order to determine whether unmuting is appropriate. For example, dynamic muting program 108 may analyze noises and/or speech in the user's background, using one or more known techniques, for embarrassing noises, such as a dog barking, or someone else in the room on a personal call. In the embodiment, if dynamic muting program 108 determines the user's background environment is neutral, or "safe," then dynamic muting program 108 automatically unmutes the user. In an embodiment, dynamic muting program 108 calculates a background confidence score and compares the score to a pre-defined background confidence threshold to determine whether to unmute the user. If the background confidence score exceeds the pre-defined background confidence threshold, then dynamic muting program 108 unmutes the user. If the background confidence score does not exceed the pre-defined background confidence threshold, then dynamic muting program 108 continues to mute the user.

If dynamic muting program 108 determines the confidence score is below the low confidence threshold ("yes" branch, decision block 214), or if dynamic muting program 108 determines an unmute signal is not received ("no" branch, decision block 218), then dynamic muting program 108 continues to mute the user (step 222). In an embodiment where dynamic muting program 108 determines unmuting the user is not the intended action, dynamic muting program 108 keeps the user on mute.

Dynamic muting program 108 stores user input and context details (step 224). In an embodiment, dynamic muting program 108 stores any feedback from the user in association with the derived meeting context and environment context details in database 110. Dynamic muting program 108 uses this stored data in a machine learning loop to improve the accuracy of the unmute confidence score calculation and associated thresholds over time by adjusting weights and/or thresholds accordingly. In an embodiment, dynamic muting program 108 feeds the data to a neural network model for continuous learning of mute/unmute scenarios.

In an embodiment, dynamic muting program 108 continues to loop through steps 206 to 224 until the collaborative meeting concludes, monitoring the meeting to determine if the user is requested to participate, and determining whether or not to unmute the user based on the meeting context and the background environment of the user.

In an example of the use of dynamic muting program 108, User X works from home every day for ABC Group on the finance team. Every month, the finance team has a web conference from 5:00 pm to 6:00 pm to review the quarterly forecast and financial data health. User X is a junior level associate and typically is only responsible for taking actions and following up on unresolved items after the meeting. User X decides to cook dinner while recording the call and invokes dynamic muting program 108, i.e., the dynamic mute feature of collaborative meeting platform 106. In a scenario where User X is occupied with a cooking task while being asked a question, User X steps back into frame of the camera associated with client computing device 112 and begins speaking. Dynamic muting program 108 determines the unmute confidence score of the scenario and compares the score to the high confidence threshold, as discussed with respect to steps 210 and 212. Dynamic muting program 108 determines the unmute confidence score exceeds the high confidence threshold and automatically unmutes client computing device 112, as discussed with respect to step 220. Thus, User X is confident in the dynamic muting feature and knows that instead of having to actively unmute the microphone associated with client computing device 112, User X can simply respond to the question, and dynamic muting program 108 automatically unmutes the microphone for as long as User X is speaking. When User X is done answering the question, dynamic muting program 108 puts the microphone back on mute.

Figure 3:
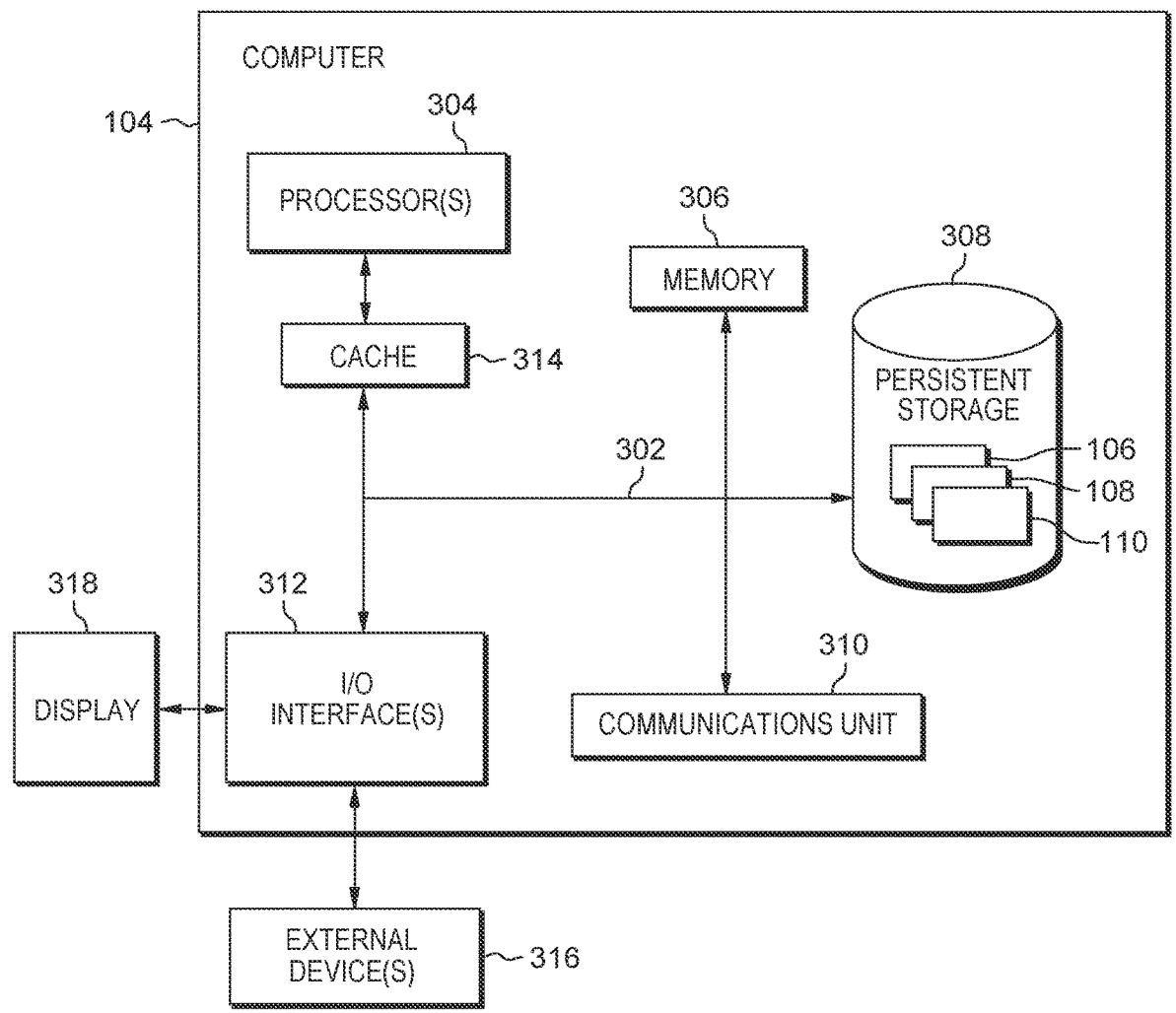
FIG. 3 depicts a block diagram of components of the server computer executing the dynamic muting program within the distributed data processing environment of FIG. 1, in accordance with an embodiment of the present invention.

FIG. 3 depicts a block diagram of components of server computer 104 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server computer 104 can include processor(s) 304, cache 314, memory 306, persistent storage 308, communications unit 310, input/output (I/O) interface(s) 312 and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 314 is a fast memory that enhances the performance of processor(s) 304 by holding recently accessed data, and data near recently accessed data, from memory 306.

Program instructions and data used to practice embodiments of the present invention, e.g., collaborative meeting platform 106, dynamic muting program 108, database 110, are stored in persistent storage 308 for execution and/or access by one or more of the respective processor(s) 304 of server computer 104 via cache 314. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of client computing device 112. In these examples, communications unit 310 includes one or more network interface cards. Communications unit 310 may provide communications through the use of either or both physical and wireless communications links. Collaborative meeting platform 106, dynamic muting program 108, database 110, and other programs and data used for implementation of the present invention, may be downloaded to persistent storage 308 of server computer 104 through communications unit 310.

I/O interface(s) 312 allows for input and output of data with other devices that may be connected to server computer 104. For example, I/O interface(s) 312 may provide a connection to external device(s) 316 such as a keyboard, a keypad, a touch screen, a microphone, a digital camera, and/or some other suitable input device. External device(s) 316 can also include portable computer readable storage media such as, for example, thumb drives, portable optical or magnetic disks, and memory cards. Software and data used to practice embodiments of the present invention, e.g., collaborative meeting platform 106, dynamic muting program 108, database 110 on server computer 104, can be stored on such portable computer readable storage media and can be loaded onto persistent storage 308 via I/O interface(s) 312. I/O interface(s) 312 also connect to a display 318.

Display 318 provides a mechanism to display data to a user and may be, for example, a computer monitor. Display 318 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing descriptions of the various embodiments of the present invention have been presented for purposes of illustration and example, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    detecting, by one or more computer processors, a start of a collaborative meeting;
    receiving, by one or more computer processors, a request to enable a dynamic mute feature for a microphone associated with a device of a user;
    muting, by one or more computer processors, the microphone;
    monitoring, by one or more computer processors, the collaborative meeting to derive context;
    determining, by one or more computer processors, a request for the user to participate in the collaborative meeting;
    retrieving, by one or more computer processors, a behavioral profile of the user, wherein audio data included in the behavioral profile includes at least a common phrase;
    determining, by one or more computer processors, the user uttered the common phrase; and
    calculating, by one or more computer processors, an unmute confidence score based on the derived context and the uttered common phrase, wherein the unmute confidence score is associated with a confidence that the user would like to be unmuted in a current scenario.

2. The computer-implemented method of claim 1, further comprising:
    determining, by one or more computer processors, whether the unmute confidence score exceeds a pre-defined high confidence threshold; and
    responsive to determining the unmute confidence score exceeds the pre-defined high confidence threshold, unmuting, by one or more computer processors, the microphone.

3. The computer-implemented method of claim 2, further comprising:
    responsive to determining the unmute confidence score does not exceed the pre-defined high confidence threshold, determining, by one or more computer processors, whether the unmute confidence score is below a pre-defined low confidence threshold; and
    responsive to determining the unmute confidence score is below the pre-defined low confidence threshold, continuing, by one or more computer processors, to mute the microphone.

4. The computer-implemented method of claim 3, further comprising:
    responsive to determining the unmute confidence score is not below the pre-defined low confidence threshold, prompting, by one or more computer processors, the user for an unmute confirmation signal, wherein the unmute confirmation signal is an indication that the user wants to be unmuted;
    determining, by one or more computer processors, the unmute confirmation signal is received; and
    unmuting, by one or more computer processors, the microphone.

5. The computer-implemented method of claim 4, wherein the unmute confirmation signal is a hands-free signal, and wherein the hands-free signal includes at least a head nod and an eye wink.

6. The computer-implemented method of claim 1, further comprising:

storing, by one or more computer processors, a user input and one or more context details.

7. The computer-implemented method of claim 1, wherein the derived context includes at least one of context of the collaborative meeting, context of an external environment of the user, and context of a location of the user.

8. The computer-implemented method of claim 1, wherein calculating the confidence score is based on at least one of: visual data and audio data.

9. The computer-implemented method of claim 8, wherein the visual data includes at least one of: the user has stepped into a frame of a camera associated with the device, a mouth of the user is moving, one or more hands of the user are moving, the user is facing the camera associated with the device, and a facial expression of the user.

10. The computer-implemented method of claim 8, wherein the audio data includes at least one of: the user is actively talking and a content of what the user is saying matches the context of the collaborative meeting.

11. A computer program product comprising:
one or more computer readable storage media and program instructions collectively stored on the one or more computer readable storage media, the stored program instructions comprising:
program instructions to detect a start of a collaborative meeting;
program instructions to receive a request to enable a dynamic mute feature for a microphone associated with a device of a user;
program instructions to mute the microphone;
program instructions to monitor the collaborative meeting to derive context;
program instructions to determine a request for the user to participate in the collaborative meeting;
program instructions to retrieve a behavioral profile of the user, wherein audio data included in the behavioral profile includes at least a common phrase;
program instructions to determine the user uttered the common phrase; and
program instructions to calculate an unmute confidence score based on the derived context and the uttered common phrase, wherein the unmute confidence score is associated with a confidence that the user would like to be unmuted in a current scenario.

12. The computer program product of claim 11, the stored program instructions further comprising:
program instructions to determine whether the unmute confidence score exceeds a pre-defined high confidence threshold; and
responsive to determining the unmute confidence score exceeds the pre-defined high confidence threshold, program instructions to unmute the microphone.

13. The computer program product of claim 12, the stored program instructions further comprising:
responsive to determining the unmute confidence score does not exceed the pre-defined high confidence threshold, program instructions to determine whether the unmute confidence score is below a pre-defined low confidence threshold; and
responsive to determining the unmute confidence score is below the pre-defined low confidence threshold, program instructions to continue to mute the microphone.

14. The computer program product of claim 13, the stored program instructions further comprising:
responsive to determining the unmute confidence score is not below the pre-defined low confidence threshold, program instructions to prompt the user for an unmute confirmation signal, wherein the unmute confirmation signal is an indication that the user wants to be unmuted;
program instructions to determine the unmute confirmation signal is received; and
program instructions to unmute the microphone.

15. The computer program product of claim 11, wherein calculating the confidence score is based on at least one of: visual data and audio data.

16. A computer system comprising:
one or more computer processors;
one or more computer readable storage media;
program instructions collectively stored on the one or more computer readable storage media for execution by at least one of the one or more computer processors, the stored program instructions comprising:
program instructions to detect a start of a collaborative meeting;
program instructions to receive a request to enable a dynamic mute feature for a microphone associated with a device of a user;
program instructions to mute the microphone;
program instructions to monitor the collaborative meeting to derive context;
program instructions to determine a request for the user to participate in the collaborative meeting;
program instructions to retrieve a behavioral profile of the user, wherein audio data included in the behavioral profile includes at least a common phrase;
program instructions to determine the user uttered the common phrase; and
program instructions to calculate an unmute confidence score based on the derived context and the uttered common phrase, wherein the unmute confidence score is associated with a confidence that the user would like to be unmuted in a current scenario.

17. The computer system of claim 16, the stored program instructions further comprising:
program instructions to determine whether the unmute confidence score exceeds a pre-defined high confidence threshold; and
responsive to determining the unmute confidence score exceeds the pre-defined high confidence threshold, program instructions to unmute the microphone.

18. The computer system of claim 17, the stored program instructions further comprising:
responsive to determining the unmute confidence score does not exceed the pre-defined high confidence threshold, program instructions to determine whether the unmute confidence score is below a pre-defined low confidence threshold; and
responsive to determining the unmute confidence score is below the pre-defined low confidence threshold, program instructions to continue to mute the microphone.

19. The computer system of claim 18, the stored program instructions further comprising:
responsive to determining the unmute confidence score is not below the pre-defined low confidence threshold, program instructions to prompt the user for an unmute confirmation signal, wherein the unmute confirmation signal is an indication that the user wants to be unmuted;
program instructions to determine the unmute confirmation signal is received; and
program instructions to unmute the microphone.

20. The computer system of claim 16, wherein calculating the confidence score is based on at least one of: visual data and audio data.

* * * * *